(12) United States Patent
Nishiguchi et al.

(10) Patent No.: US 8,993,687 B2
(45) Date of Patent: Mar. 31, 2015

(54) METHOD FOR PRODUCTION OF BIODEGRADABLE POLYOXYETHYLENE DERIVATIVE

(71) Applicant: NOF Corporation, Tokyo (JP)

(72) Inventors: Kosuke Nishiguchi, Kawasaki (JP); Tsuyoshi Takehana, Kawasaki (JP); Yuji Yamamoto, Kawasaki (JP)

(73) Assignee: NOF Corporation, Tokyo (JP)

( * ) Notice: Subject to any disclaimer, the term of this patent is extended or adjusted under 35 U.S.C. 154(b) by 0 days.

(21) Appl. No.: 14/205,625

(22) Filed: Mar. 12, 2014

(65) Prior Publication Data
US 2014/0296563 A1   Oct. 2, 2014

(30) Foreign Application Priority Data
Mar. 26, 2013   (JP) ................................ 2013-063570

(51) Int. Cl.
| | | |
|---|---|---|
| *C08F 20/00* | (2006.01) | |
| *C08G 63/91* | (2006.01) | |
| *C08F 6/00* | (2006.01) | |
| *C08G 63/00* | (2006.01) | |
| *C08G 65/04* | (2006.01) | |
| *C08G 59/00* | (2006.01) | |
| *C08G 65/48* | (2006.01) | |

(52) U.S. Cl.
CPC ...................... *C08G 65/48* (2013.01)
USPC ........... 525/450; 525/415; 528/488; 528/491; 528/366; 528/421; 528/403

(58) Field of Classification Search
USPC .......... 525/450, 415; 528/488, 491, 366, 421, 528/403
See application file for complete search history.

(56) References Cited

U.S. PATENT DOCUMENTS 5,410,016 A    4/1995   Hubbell et al.
2008/0081888 A1   4/2008   Kubo et al.

FOREIGN PATENT DOCUMENTS

JP   2008-106269   5/2008

*Primary Examiner* — Jafar Parsa
(74) *Attorney, Agent, or Firm* — Rankin, Hill & Clark LLP

(57) ABSTRACT

There is provided a method for production of a high-purity biodegradable polyoxyethylene derivative on an industrial scale using a polyoxyethylene compound containing polylactic acid at the terminal thereof. A biodegradable polyoxyethylene compound represented by formula (1) and a compound represented by formula (I) are caused to react with each other at 60° C. to 120° C. using toluene as a solvent in the presence of sodium acetate to obtain a biodegradable polyoxyethylene derivative represented by formula (2).

4 Claims, No Drawings

METHOD FOR PRODUCTION OF BIODEGRADABLE POLYOXYETHYLENE DERIVATIVE

TECHNICAL FIELD

The present invention relates to a method for production of a biodegradable polyoxyethylene derivative.

BACKGROUND ART

In recent years, the demand for various biocompatible materials has been increased for use in, for example, tissue engineering and drug delivery systems (DDSs). For example, a method for suppressing side effects and improving retention in the blood by modifying a physiologically active substance such as a drug or polypeptide with a hydrophilic polymer such as polyethylene glycol has been studied. Furthermore, a cross-linked polymer composition formed through gelation of a plurality of components has been developed and studied for use in, for example, cell scaffolds, drug-release devices, sutures/bone fixation agents, hemostatics, and tissue adhesion inhibitors.

An example of such a cross-linked polymer composition is a hydrogel formed by mixing a synthetic polypeptide or a polyethylene glycol derivative having a plurality of nucleophilic groups such as a primary amino group and a thiol group and a hydrophilic or hydrophobic polymer derivative having an electrophilic group such as an N-hydroxysuccinimidyl group.

To sufficiently exhibit the function of the gel formed of a cross-linked polymer, the polymer derivatives to be mixed equally react with each other and a three-dimensional network structure needs to be uniformly formed. Therefore, it is important to introduce a reactive functional group into the polymers at a high introduction ratio.

Furthermore, biodegradable polymers such as polylactic acid and polyglycolic acid and copolymers obtained by introducing such biodegradable polymers into polyethylene glycol or the like as biodegradable moieties have received attention and have been widely used in order to enzymatically or non-enzymatically hydrolyze a drug, which has been implanted into a body or sustainedly released at a target site, into nontoxic components and cause metabolism and absorption.

It is highly important to establish a method for production of a high-purity polymer derivative on an industrial scale, the polymer derivative being produced by introducing a reactive functional group into such a polymer having a biodegradable moiety.

One of methods for production of a high-purity polymer derivative having a biodegradable moiety is purification performed by preparative liquid chromatography. However, polymer derivatives having different numbers of functional groups have similar physical properties depending on their structures. Therefore, it is often difficult to separate a target substance or conduct removal. Even if removal can be conducted, some problems such as a decrease in the yield are caused. Thus, such a method is not efficient on an industrial scale. Although a polymer derivative can be produced with a high yield by purification performed by recrystallization or crystal precipitation, it is also difficult to remove polymer derivatives having different numbers of functional groups.

Accordingly, in order to produce a high-purity polymer derivative having a biodegradable moiety on an industrial scale, it is important to achieve a high functional group introduction ratio in a reaction process.

For example, PTL 1 discloses, as a method for production of a polymer derivative having a biodegradable moiety, a method for production of acrylic-polyhydroxy acid-polyoxyethylene obtained by causing polyhydroxy acid-polyoxyethylene to react with acryloyl chloride in the presence of triethylamine. However, triethylamine hydrochloride formed as a by-product is filtered at a very low rate, and cools and solidifies on a filter surface. Consequently, the filtration cannot be completed. From this point of view, the method disclosed in PTL 1 is not suitable for industrial production.

In the reaction of introducing a functional group, if the type of catalyst is inappropriate, the bond of the biodegradable moiety is cleaved. Thus, the selection of the catalyst is limited. In particular, a substance terminated with a secondary hydroxyl group, such as polylactic acid, has reactivity lower than that of a substance terminated with a primary hydroxyl group. Therefore, the selection of a catalyst is particularly important to produce a high-purity polymer.

PTL 2 discloses a method for production of pentaerythritol polyoxyethylene-polylactide-tetraglutarate obtained by causing pentaerythritol polyoxyethylene-polylactide terminated with a secondary hydroxyl group to react with glutaric anhydride in the presence of potassium carbonate.

CITATION LIST

Patent Literature

[PTL 1] U.S. Pat. No. 5,410,016
[PTL 2] Japanese Unexamined Patent Application Publication No. 2008-106269

SUMMARY OF INVENTION

Technical Problem

In the production method described in PTL 2, the functional group introduction ratio increases at the initial stage as the reaction time is lengthened. However, the functional group introduction ratio reaches its limit at a certain point in time. It has been found that, if the reaction time is lengthened to beyond this point in time, the bond of the biodegradable moiety is cleaved and the functional group introduction ratio decreases.

Therefore, the reaction needs to be terminated before cleavage occurs in order to obtain a high-purity polymer derivative. However, in such a heterogeneous system, the reaction behavior sometimes varies due to the batch scale, agitation speed, and the like. There is a possibility that an appropriate reaction time with which the biodegradable moiety is not cleaved and which is determined on a laboratory scale is not reproducible. This causes a concern about a decrease in the purity in the production on an industrial scale. Thus, it is desirable to create a method for production of a polymer derivative in which the biodegradable moiety is not cleaved in a reaction process and high purity can be stably maintained even on an industrial scale.

It is an object of the present invention to provide a method for production of a high-purity biodegradable polyoxyethylene derivative on an industrial scale using a polyoxyethylene compound containing polylactic acid at its terminal.

Solution to Problem

As a result of thorough studies conducted to achieve the above object, the inventors of the present invention have found the following production method. That is, a biodegradable polyoxyethylene compound represented by formula (1) below and a compound represented by formula (I) are caused to react with each other at 60° C. to 120° C. in toluene in the presence of sodium acetate. Consequently, a high-purity biodegradable polyoxyethylene derivative represented by formula (2) below can be produced on an industrial scale without posing the conventional problems. Thus, the present invention has been completed.

That is, the present invention is as follows.

[1] A method for production of a biodegradable polyoxyethylene derivative (hereafter referred to as a compound (2)) represented by formula (2) below includes causing a reaction of a biodegradable polyoxyethylene compound (hereafter referred to as a compound (1)) represented by formula (1) below and a compound (hereafter referred to as a compound (I)) represented by formula (I) below at 60° C. to 120° C. using toluene as a solvent in the presence of sodium acetate.

[Chem. 1]

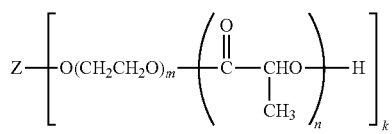
(1)

(In formula (1), Z represents a residue of a compound having 1 to 8 hydroxyl groups, m represents 1 to 2000, n represents 1 to 20, and k represents 1 to 8.)

[Chem. 2]

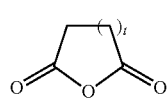
(I)

(In formula (I), t represents 1 to 2.)

[Chem. 3]

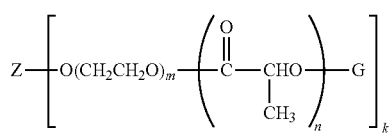
(2)

(In formula (2), Z represents a residue of a compound having 1 to 8 hydroxyl groups, m represents 1 to 2000, n represents 1 to 20, k represents 1 to 8, and G represents a residue of the compound represented by formula (I), the residue being derived from the reaction.)

[2] The method for production described in [1], wherein t represents 2.

[3] The method for production described in [1] or [2], wherein n represents 1 to 4.

Advantageous Effects of Invention

According to the production method of the present invention, high purity can be stably maintained in the reaction process without causing a decrease in the functional group introduction ratio due to the cleavage of a biodegradable moiety by using sodium acetate as a reaction catalyst. Therefore, the production method of the present invention is advantageous in an industrial scale production in which the reaction behavior may vary due to a factor such as a batch scale. Thus, a biodegradable polyoxyethylene derivative with higher quality than before can be stably provided.

DESCRIPTION OF EMBODIMENTS

In this specification, Z in formula (1) or (2) represents a residue of a compound having 1 to 8 hydroxyl groups, and the structure of Z may be a linear, branched, or cyclic structure. That is, the chemical formula of "the compound having 1 to 8 hydroxyl groups" is $Z(OH)_k$ (k=1 to 8) and k represents the number of hydroxyl groups contained in "the compound having 1 to 8 hydroxyl groups". "The residue of the compound having 1 to 8 hydroxyl groups" means a functional group constituted by a remaining portion provided by removing hydroxyl groups from the compound $Z(OH)_k$.

Examples of "the compound having 1 to 8 hydroxyl groups" ($Z(OH)_k$) include polyglycerol compounds such as diglycerol, triglycerol, tetraglycerol, pentaglycerol, and hexaglycerol; monohydric alkyl alcohols having 1 to 6 carbon atoms, such as methanol; dihydric alcohols such as ethylene glycol; trihydric alcohols such as glycerol; and sugar alcohols such as pentaerythritol, xylitol, sorbitol, and mannitol. Among the monohydric alkyl alcohols, methanol, ethanol, and 2-methyl-2-propanol are preferably used and methanol is more preferably used.

In formula (1) or (2), m represents the average number of addition moles of an oxyethylene group, which is 1 to 2000 and preferably 20 to 1000, and m×k is preferably 20 to 1000 and particularly preferably 100 to 500.

In formula (1) or (2), n represents the average degree of polymerization of polylactic acid serving as a biodegradable moiety, which is 1 to 20, preferably 1 to 10, and more preferably 1 to 5.

The compound (I) is specifically succinic anhydride (t=1) represented by formula (I-1) below or glutaric anhydride (t=2) represented by formula (I-2) below, and is preferably glutaric anhydride.

[Chem. 4]

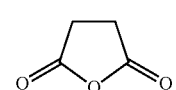
(I-1)

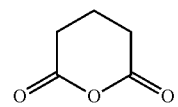
(I-2)

G represents a residue derived from the reaction of the compound (I) and the compound (1) and is, for example, a group represented by formula (i) below. In formula (i), the definition of t is the same as above.

[Chem. 5]

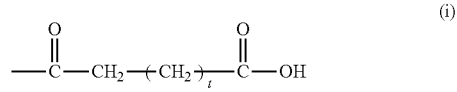
(i)

The compound (1) used in the production method of the present invention is a block copolymer obtained by adding a monomer of 3,6-dimethyl-1,4-dioxane-2,5-dione to hydroxyl groups of polyoxyethylene. The biodegradable moiety of the compound (1) is polylactic acid. The configuration of an asymmetric carbon atom in the polylactic acid is not particularly limited, and S (poly(L-lactic acid)), R (poly(D-lactic acid)), or a mixture thereof at any ratio may be used.

The compound (1) can be produced by a publicly known method. For example, a monomer of 3,6-dimethyl-1,4-dioxane-2,5-dione is polymerized in an organic solvent containing a polyoxyethylene derivative in the presence of tin octylate (tin 2-ethylhexanoate), and then crystal precipitation or the like is performed.

In the present invention, the compound (1) is caused to react with the compound (I) in the presence of sodium acetate. Herein, all the compounds may be charged and caused to react with each other. The reaction is preferably caused by adding the compound (I) to the compound (1) in the presence of sodium acetate. Furthermore, the compound (1) has a water absorbing property and thus it is desirable to sufficiently dehydrate the compound (1) before the reaction. From this point of view, the sodium acetate used is preferably not a hydrate, but an anhydride.

Regarding the amount of sodium acetate used, if the number of moles of sodium acetate is excessively larger than that of hydroxyl groups in the compound (1), the biodegradable moiety may be cleaved. Furthermore, the terminal of polylactic acid is a secondary hydroxyl group having low reactivity. Therefore, if the number of moles of sodium acetate is smaller than that of hydroxyl groups in the compound (1), the functional group introduction ratio decreases and consequently a high-purity product cannot be obtained.

From this point of view, the amount of sodium acetate used is preferably, on a molar basis, 1 to 100 times, more preferably 1 to 50 times, and further preferably 1 to 20 times the total hydroxyl group equivalent, that is, "the number of hydroxyl groups per mole of the compound (1)×the number of moles of the compound (1)".

The charging amounts of the compound (1) and compound (I) are desirably determined so that the charging amount of the compound (I) is excessively larger than that of the compound (1). This is because, if the amount of the compound (I) is excessively large, an unreacted compound can be easily removed in a purification step described below. However, if the amount of the compound (1) is excessively large, an unreacted compound (1) is left. It is difficult to remove the unreacted compound (1) by a method such as crystal precipitation and consequently a high-purity product cannot be obtained.

From this point of view, the charging amount of the compound (I) is preferably, on a molar basis, 1 to 100 times and more preferably 1.1 to 50 times the total hydroxyl group equivalent, that is, "the number of hydroxyl groups per mole of the compound (1)×the number of moles of the compound (1)".

The amount of toluene used as a reaction solvent is preferably 0.1 to 100 times and more preferably 1 to 20 times the amount of the compound (1) on a mass basis.

The reaction temperature is 60° C. to 120° C. and preferably 80° C. to 120° C. The reaction time is preferably 1 hour or more and more preferably 3 hours or more. The upper limit of the reaction time is not particularly set because decomposition does not readily occur even if the reaction time is lengthened. From the viewpoint of production efficiency, the reaction time is preferably 50 hours or less and more preferably 20 hours or less.

Thus, a high-purity compound (2) can be produced in which the compound (1) and the compound (I) are bonded to each other and a desired functional group is introduced.

After the completion of the reaction, a purification step is performed. That is, the purification step includes removing the sodium acetate from the reaction solution by filtration and then concentrating the filtrate or adding the filtrate to a poor solvent to perform crystallization. Thus, the compound (2) can be produced with a high yield.

A filter medium used for the filtration is not particularly limited as long as insoluble matter in a solution to be treated can be removed. In general, a filter composed of a material having a particle-retention pore size of 1 to 10 μm and solvent resistance, such as paper or glass, can be used. A filtration method is not limited. For example, vacuum filtration, pressure filtration, or centrifugal filtration can be employed.

The crystallization can be achieved by merely cooling the obtained filtrate. However, the compound (2) may be left in the solution without being sufficiently precipitated depending on the type of solvent, which may decrease the yield. Therefore, the crystallization can be sufficiently achieved by cooling the filtrate preferably to 10° C. or lower using a poor solvent. Consequently, crystals can be obtained with a high yield. Alternatively, the crystallization may be achieved by removing the organic solvent through distillation or the like and, if necessary, recrystallization, reprecipitation, crystal precipitation, or the like may be performed.

The organic solvent used for the crystallization is preferably a solvent that can remove an unreacted compound (I) present in an excessive amount and particularly preferably a solvent that dissolves the compound (2), which is a target compound, but does not dissolve the compound (I) or only slightly dissolves the compound (I). Examples of the organic solvent include ethyl acetate, acetone, dimethylformamide, dimethylsulfoxide, toluene, chloroform, and acetonitrile. These solvents are good solvents for the compound (2).

When crystallization is performed using such a good solvent, the dissolution temperature is preferably 0° C. to 120° C. and more preferably 20° C. to 70° C.

The amount of the organic solvent used is preferably 1 to 100 times and more preferably 2 to 50 times the amount of the crystals on a mass basis.

The crystallization may be performed by dissolving the filtrate only in a good solvent and then performing cooling or adding a poor solvent. When the filtrate is dissolved in a good solvent and then a poor solvent is added to perform crystallization, the ratio of the solvents is preferably determined so that only the compound (2), which is a target compound, is crystallized while an unreacted compound (I) is still dissolved in the solvent mixture. The ratio of the solvents can be suitably selected in accordance with the solvents used.

Specific methods for crystallization are exemplified below.
(A) The reaction solution is filtered to remove the sodium acetate. The filtrate is directly cooled to precipitate the compound (2), which is a target compound, or at least one solvent, that is, a good solvent such as ethyl acetate, acetone, or toluene is added to the filtrate and then cooling is performed to precipitate the compound (2).

In this method, if the type of solvent is inappropriate or the molecular weight of the compound (1) is 3000 or less, the compound (2) is sometimes not sufficiently crystallized.

(B) The reaction solution is filtered to remove the sodium acetate. A poor solvent such as an ether or an aliphatic hydrocarbon having 5 to 8 carbon atoms is added to the filtrate to precipitate crystals of the compound (2). Alternatively, the filtrate is dissolved by adding a good solvent such as ethyl acetate, acetone, or toluene, and then a poor solvent such as an ether or an aliphatic hydrocarbon having 5 to 8 carbon atoms is added to the resulting solution to precipitate crystals of the compound (2).

(C) The reaction solution is filtered to remove the sodium acetate. The filtrate is dissolved by adding a mixture of an ether and an aliphatic hydrocarbon having 5 to 8 carbon atoms, which serve as poor solvents, in such an amount that the compound (2), which is a target compound, is not precipitated and then cooling is performed. Alternatively, the filtrate is dissolved by adding at least one good solvent such as ethyl acetate, acetone, or toluene and adding a mixture of an ether and an aliphatic hydrocarbon having 5 to 8 carbon atoms, which serve as poor solvents, in such an amount that the compound (2), which is a target compound, is not precipitated and then cooling is performed.

As described above, in order to produce the compound (2), which is a target compound, with a high yield, the molecular weight of the compound (1) may be suitably selected or the above methods (A) to (C), the type of solvent, the temperature, and the like may be suitably selected in accordance with the compound (I) used.

Non-limiting examples of the aliphatic hydrocarbon having 5 to 8 carbon atoms, which is used as the poor solvent, include pentane, isopentane, neopentane, hexane, isohexane, 3-methylpentane, neohexane, 2,3-dimethylbutane, heptane, 2-methylhexane, 3-methylhexane, 3-ethylpentane, 2,2-dimethylpentane, 2,3-dimethylpentane, 3,3-dimethylpentane, 2,3,3-trimethylbutane, octane, 2-methylheptane, 3-methylheptane, 4-methylheptane, 3-ethylhexane, 2,2-dimethylhexane, 2,3-dimethylhexane, 2,4-dimethylhexane, 2,5-dimethylhexane, 3,3-dimethylhexane, 3,4-dimethylhexane, 2-methyl-3-ethylpentane, 3-methyl-3-ethylpentane, 2,2,3-trimethylpentane, 2,2,4-trimethylpentane, and 2,2,3,3-tetramethylbutane. In particular, hexane and heptane are preferably used.

In the compound (2) produced by the method of the present invention, the active group G can be subjected to functional group transformation by a publicly known method. For example, imidization into N-hydroxysuccinimide can be performed by using N-hydroxysuccinimide and DCC (1,1'-dicyclohexylcarbodiimide), and furthermore the resulting compound can be caused to react with a compound having an amino group or the like.

For example, by subjecting G in the compound (2) to functional group transformation, the compound (2) can be transformed into a compound terminated with a thiol group, an amino group, an acetal group, an aldehyde group, or the like.

The compound (2) produced by the method of the present invention and the derivatives thereof can form a cross-linked polymer through gelation or the like and can be used for, for example, drug-release devices, sutures/bone fixation agents, hemostatics, and tissue adhesion inhibitors in the medical field. The compound (2) and the derivatives thereof can also be used as a polymer for improving retention in the blood and achieving sustained release of a drug at a target site.

EXAMPLES

The present invention will be further specifically described below based on Examples, but is not limited thereto. Compounds in Examples were identified with $^1$H-NMR and the purity analysis in Example 1 and Comparative Example 1 was performed with ion-exchange HPLC.

<Analysis Method of $^1$H-NMR>

In $^1$H-NMR analysis, JNM-ECP400 and JNM-ECA600 manufactured by JEOL Ltd. were used. The integral in the NMR measurement described below is a theoretical value.

<Analysis Method of Ion-Exchange HPLC>

In ion-exchange HPLC analysis, the measurement was performed using Waters Alliance as an HPLC system under the following conditions.

Waters Alliance

Developing solvent: 20 mM ammonium formate buffer solution (pH 8.0)

Flow rate: 1.0 mL/min

Column: Asahipak ES-502N (Asahi Kasei Corporation)

Column temperature: 30° C.

Detector: RI

Amount of sample: 10 mg/g, 20 μL

Production Example 1

Synthesis of pentaerythritol polyoxyethylene-polylactide (the case where Z=residue formed as a result of dehydroxylation of pentaerythritol, m=about 56, n=about 3 (average degree of polymerization), molecular weight: about 10000)

Into a 5-L round-bottom flask equipped with a thermometer, a nitrogen-blowing tube, an agitator, a Dean-Stark tube, and a cooling tube, 1200 g of pentaerythritol polyoxyethylene (SUNBRIGHT PTE-10000 (0.12 mol, manufactured by NOF CORPORATION)) and 1200 g of toluene were charged. Heat reflux was performed to remove 180 g of toluene and water through azeotropy. The reaction solution was cooled to 50° C., and 13.7 g of 28% tin 2-ethylhexanoate and 103 g (0.72 mol) of 3,6-dimethyl-1,4-dioxane-2,5-dione were added thereto. The temperature was increased to 110° C. and then the reaction was caused to proceed for 5 hours. After the completion of the reaction, the reaction solution was cooled to 30° C., diluted with 3600 g of toluene, and then filtered to remove insoluble matter. By adding 3600 g of hexane, crystals were precipitated. The precipitated crystals were filtered. After 7200 g of ethyl acetate was added to the crystals and the crystals were dissolved by heating, 3600 g of hexane was added to perform recrystallization. This crystal precipitation process was performed twice in total. The crystals were washed with 7200 g of hexane, filtered, and dried to obtain pentaerythritol polyoxyethylene-polylactide (p1) shown below. Herein, the average degree of polymerization n of polylactic acid can be determined by adjusting the integral of peaks in δ3.40-3.90 (ppm) to a theoretical value and dividing the integral of peaks in δ1.45-1.61 (ppm) by 12. $^1$H-NMR (CDCl$_3$, internal standard: TMS) δ (ppm):

1.45-1.61 (36H, m, —CH(C$\underline{H}_3$)O—), 3.40-3.90 (899H, m, —(C$\underline{H}_2$C$\underline{H}_2$O)m-, —C—C$\underline{H}_2$—O—), 4.20-4.40 (12H, m, —C$\underline{H}_2$OC(=O)—, —C$\underline{H}$(CH$_2$)—OH), 5.08-5.23 (8H, m, —C$\underline{H}$(CH$_3$)O—)

[Chem. 6]

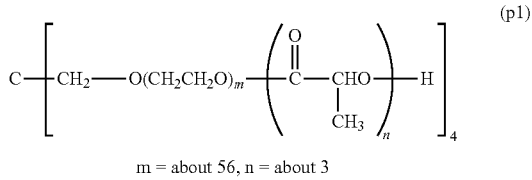

m = about 56, n = about 3

Example 1

Synthesis of pentaerythritol polyoxyethylene-polylactide-tetraglutarate (the case where Z=residue formed as a result of dehydroxylation of pentaerythritol, m=about 56, n=about 3 (average degree of polymerization), molecular weight: about 10000)

Into a 500-mL round-bottom flask equipped with a thermometer, a nitrogen-blowing tube, an agitator, a Dean-Stark tube, and a cooling tube, 60 g (57 mmol) of the pentaerythritol polyoxyethylene-polylactide (p1) obtained in Production Example 1 and 150 g of toluene were charged. Heat reflux was performed to remove 30 g of toluene and water through azeotropy. The reaction solution was cooled to 45° C., and 5.6 g (68 mmol) of sodium acetate and 13 g (0.11 mol) of glutaric anhydride were added thereto. The temperature was increased to 110° C. and then the reaction was caused to proceed for 3 hours, 6 hours, or 9 hours. After the completion of the reaction, the reaction solution was cooled to 40° C., diluted with 120 g of toluene, and then filtered to remove insoluble matter. The filtrate was diluted with 120 g of ethyl acetate, and 240 g of hexane was added thereto to precipitate crystals. The precipitated crystals were filtered. After 360 g of ethyl acetate was added to the crystals and the crystals were dissolved by heating, 180 g of hexane was added to perform recrystallization. This crystal precipitation process was performed three times in total. The crystals were washed with 360 g of hexane, filtered, and dried to obtain pentaerythritol polyoxyethylene-polylactide-tetraglutarate (p2) shown below. $^1$H-NMR (CDCl$_3$, internal standard: TMS) δ (ppm): 1.45-1.61 (36H, m, —CH(C$\underline{H}_3$)O—), 1.97 (8H, quint, —C(=O)CH$_2$C$\underline{H}_2$CH$_2$C(=O)—), 2.47 (16H, m, —C(=O)C$\underline{H}_2$CH$_2$C$\underline{H}_2$C(=O)—), 3.40-3.90 (899H, m, —(C$\underline{H}_2$C$\underline{H}_2$O)m-, —C—C$\underline{H}_2$—O—), 4.20-4.40 (8H, m, —C$\underline{H}_2$OC(=O)—), 5.08-5.23 (12H, m, —C$\underline{H}$(CH$_3$)O—)

[Chem. 7]

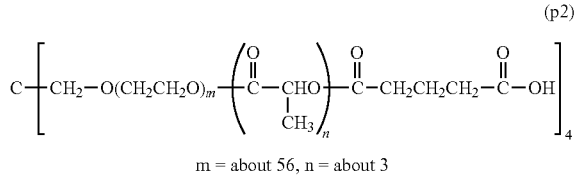

m = about 56, n = about 3

Comparative Example 1

Synthesis of pentaerythritol polyoxyethylene-polylactide-tetraglutarate (the case where Z=residue formed as a result of dehydroxylation of pentaerythritol, m=about 56, n=about 3 (average degree of polymerization), molecular weight: about 10000)

Into a 100-mL round-bottom flask equipped with a thermometer, a nitrogen-blowing tube, an agitator, a Dean-Stark tube, and a cooling tube, 10 g (1.0 mmol) of the pentaerythritol polyoxyethylene-polylactide (p1) obtained in Production Example 1 and 35 g of toluene were charged. Heat reflux was performed to remove 15 g of toluene and water through azeotropy. The reaction solution was cooled to 45° C., and 11 g (76 mmol) of potassium carbonate and 3.0 g (26 mmol) of glutaric anhydride were added thereto. The temperature was increased to 110° C. and then the reaction was caused to proceed for 3 hours, 6 hours, or 9 hours. After the completion of the reaction, the reaction solution was cooled to 40° C. and filtered to remove insoluble matter. The filtrate was diluted with 10 g of ethyl acetate, and 50 g of hexane was added thereto to precipitate crystals. The precipitated crystals were filtered. After 50 g of ethyl acetate was added to the crystals and the crystals were dissolved by heating, 50 g of hexane was added to perform recrystallization. This crystal precipitation process was performed twice in total. The crystals were washed with 50 g of hexane, filtered, and dried to obtain pentaerythritol polyoxyethylene-polylactide-tetraglutarate (p2). $^1$H-NMR (CDCl$_3$, internal standard: TMS) was the same as in Example 1.

(Calculation of Purity by Ion-Exchange HPLC Analysis)

Ion-exchange HPLC was performed on the compounds (p2) obtained with the reaction times in Example 1 and Comparative Example 1. The purity (four-functional-group introduction ratio) was calculated on the basis of the ratio (%) of an peak area at a retention time of about 14 minutes to the total peak area in the obtained chromatograph. Table 1 shows the measurement results.

TABLE 1

| | Four-functional-group introduction ratio (%) | | |
|---|---|---|---|
| | Reaction 3 hours | Reaction 6 hours | Reaction 9 hours |
| Example 1 | 88 | 89 | 89 |
| Comparative Example 1 | 68 | 75 | 52 |

As is clear from Table 1, the four-functional-group introduction ratio in Example 1 did not change even if the reaction time was lengthened whereas the four-functional-group introduction ratio in Comparative Example 1 was considerably dependent on the reaction time. That is, in the production method that uses sodium acetate as a catalyst according to the present invention, the functional group introduction ratio was not decreased and high purity was stably maintained during the reaction process.

The invention claimed is:

1. A method for production of a biodegradable polyoxyethylene derivative, the method comprising causing a reaction of a biodegradable polyoxyethylene compound represented by formula (1) below:

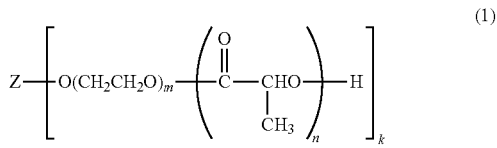

(in formula (1), Z represents a residue of a compound having 1 to 8 hydroxyl groups, m represents 1 to 2000, n represents 1 to 20, and k represents 1 to 8) and a compound represented by formula (I) below:

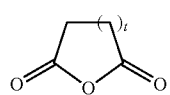

(in formula (I), t represents 1 to 2) at 60° C. to 120° C. using toluene as a solvent in the presence of sodium acetate to obtain a biodegradable polyoxyethylene derivative represented by formula (2) below:

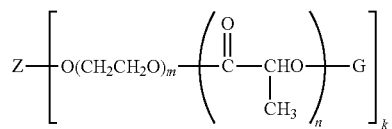

(in formula (2), Z represents a residue of a compound having 1 to 8 hydroxyl groups, m represents 1 to 2000, n represents 1 to 20, k represents 1 to 8, and G represents a residue of the compound represented by formula (I), the residue being derived from the reaction).

2. The method for production according to claim 1, wherein t represents 2.

3. The method for production according to claim 1, wherein n represents 1 to 4.

4. The method for production according to claim 2, wherein n represents 1 to 4.

* * * * *